(12) United States Patent
Nilsson et al.

(10) Patent No.: US 10,108,838 B2
(45) Date of Patent: Oct. 23, 2018

(54) FINGERPRINT SENSING AND BODY AREA NETWORK COMMUNICATION SYSTEM

(71) Applicant: Fingerprint Cards AB, Göteborg (SE)

(72) Inventors: Jan Nilsson, Harlösa (SE); Markus Andersson, Lomma (SE)

(73) Assignee: FINGERPRINT CARDS AB, Göteborg (SE)

( * ) Notice: Subject to any disclaimer, the term of this patent is extended or adjusted under 35 U.S.C. 154(b) by 65 days.

(21) Appl. No.: 15/590,393

(22) Filed: May 9, 2017

(65) Prior Publication Data
US 2018/0005001 A1 Jan. 4, 2018

(30) Foreign Application Priority Data

Jun. 30, 2016 (SE) ...................................... 1650943

(51) Int. Cl.
| | |
|---|---|
| *H04L 29/06* | (2006.01) |
| *G06K 9/00* | (2006.01) |
| *G01D 5/24* | (2006.01) |
| *H04B 13/00* | (2006.01) |

(52) U.S. Cl.
CPC ............. *G06K 9/0002* (2013.01); *G01D 5/24* (2013.01); *H04B 13/005* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 2015/0163221 A1 | 6/2015 | Bolin et al. | |
| 2015/0347807 A1* | 12/2015 | Weber | G06K 9/0002 382/124 |
| 2016/0239823 A1* | 8/2016 | Bengtsson | G06F 1/163 |

(Continued)

FOREIGN PATENT DOCUMENTS

| | | |
|---|---|---|
| EP | 1 914 656 | 4/2008 |
| WO | WO 2015/183170 | 12/2015 |

OTHER PUBLICATIONS

Swedish Search Report from Swedish Patent Application No. 1650943-2, dated Dec. 21, 2016.

(Continued)

*Primary Examiner* — Jeffery L Williams
(74) *Attorney, Agent, or Firm* — RMCK Law Group PLC

(57) ABSTRACT

The present invention relates to a combined fingerprint sensing and body area network communication system for communication with an electronic unit using the body of a user as communication medium, comprising: a sensing arrangement and a body area network communication circuitry. The system is controllable between: a fingerprint sensing state, in which a first signal corresponding to the finger potential is provided to a connection electrode and a readout circuitry is controlled to provide sensing signals indicative of the capacitive coupling between each sensing structure and the user's finger; and a body area network communication state in which a second signal is provided to the connection electrode by a first of the electronic unit and the body area network communication circuitry to the other one of the electronic unit and the body area network communication circuitry.

16 Claims, 8 Drawing Sheets

(56) References Cited

U.S. PATENT DOCUMENTS

| | | | |
|---|---|---|---|
| 2017/0098115 A1* | 4/2017 | Wickboldt | G06K 9/00026 |
| 2017/0143206 A1* | 5/2017 | Kotz | A61B 5/0028 |
| 2018/0005001 A1* | 1/2018 | Nilsson | G01D 5/24 |
| 2018/0060640 A1* | 3/2018 | Mrazek | G06K 9/00033 |
| 2018/0107854 A1* | 4/2018 | Tsai | G06K 9/0002 |
| 2018/0225496 A1* | 8/2018 | Li | G06K 9/0002 |

OTHER PUBLICATIONS

Swedish Office Action for Swedish Application No. 1650943-2 dated Dec. 21, 2016, 6 pages.

* cited by examiner

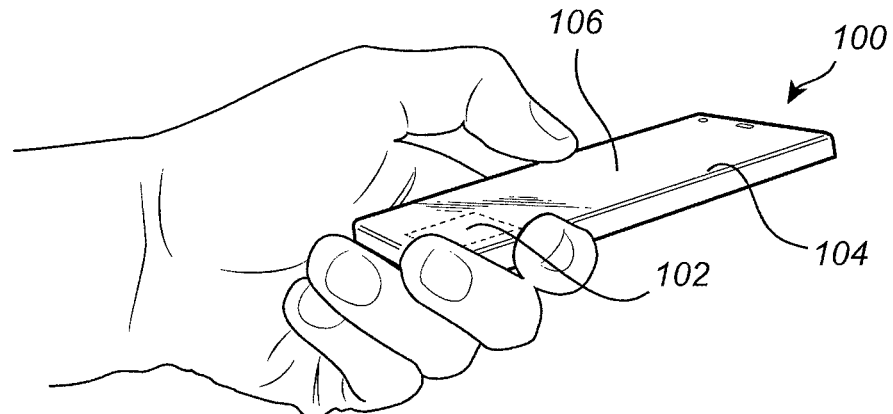
Fig. 1
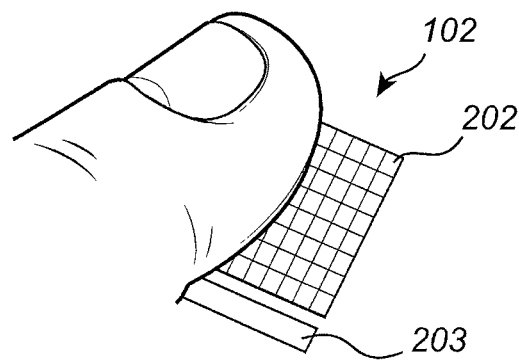
Fig. 2a
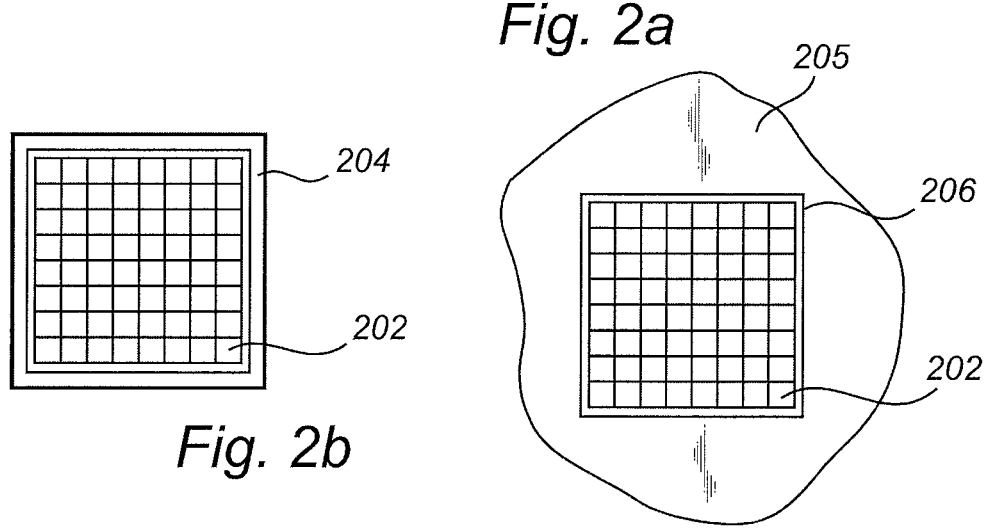
Fig. 2b
Fig. 2c

FINGERPRINT SENSING AND BODY AREA NETWORK COMMUNICATION SYSTEM

CROSS-REFERENCE TO RELATED APPLICATION

The present application is based on and claims the benefit of Swedish patent application Serial No. 1650943-2, filed Jun. 30, 2016, the content of which is hereby incorporated by reference in its entirety.

FIELD OF THE INVENTION

The present invention relates to a combined fingerprint sensing and body area network communication system for communication with an electronic unit using the body of a user as communication medium. The present invention further relates to an electronic device comprising such combined system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

There is further an increasing usage of so-called body area networks in which electronic equipment is connected to a network using the body as communication medium. For example, in the medical industry it is has become common to connect e.g. sensors to a patients body for measuring health information from the patient, the information is downloaded via the body area network of the patient. The body area network (so-called BAN) can be used for both downloading information from the electronic equipment and for uploading information to the electronic equipment via the BAN. In order to connect to the BAN, a connection point, e.g. antenna is typically used.

To protect the user, the BAN requires authorization to access the network. This can be implemented by requiring the user to enter a password each time. For higher level of security and a more time efficient way is to implement a fingerprint sensor for authorization.

US2015/0163221 discloses to use a fingerprint sensor for allowing access to a BAN. In US2015/0163221, the BAN system comprises a (yellow) ring which is simply attached to the scanner for connecting to the BAN. An electrode is arranged to detect the presence of a user, to thereby control the BAN to send requests and the fingerprint sensor to start scanning for biometric data.

Although the solution proposed by US2015/0163221 provides for access via a fingerprint sensor there still appears to be room for improvement related to integration of BAN components and fingerprint sensor components and to coexistence of the BAN system and the fingerprint sensor.

SUMMARY

In view of above-mentioned and other drawbacks of the prior art, it is an object of the present invention to provide a combined fingerprint sensing and body area network communication system with improved integration.

According to a first aspect of the present invention, it is therefore provided a combined fingerprint sensing and body area network communication system for communication with an electronic unit using the body of a user as communication medium, comprising: a sensing arrangement comprising: an array of sensing elements for sensing a fingerprint pattern, each sensing element comprising a sensing structure for capacitive coupling with the finger; and read out circuitry connected to each of the sensing structures for providing sensing signals indicative of a capacitive coupling between each sensing structure and the user's finger in response to a change in potential difference between a sensing structure potential of the sensing structure and a finger potential of the finger; a connection electrode arranged adjacent to the sensing structures for making electrical contact with the finger when sensing the fingerprint pattern; and a body area network communication circuitry, wherein the system is controllable between: a fingerprint sensing state, in which a first signal corresponding to the finger potential is provided to the connection electrode and the readout circuitry is controlled to provide the sensing signals indicative of the capacitive coupling between each sensing structure and the user's finger; and a body area network communication state in which a second signal is provided to the connection electrode by a first of the electronic unit and the body area network communication circuitry, the signal is to be sent from the first of the electronic device and the body area network communication circuitry via the user's body to the other one of the electronic unit and the body area network communication circuitry.

The sensing structures may, for example, be capacitive sensing structures, each providing a measure indicative of the capacitive coupling between that particular sensing structure and a finger surface touching the sensor surface. Sensing structures at locations corresponding to ridges in the fingerprint will exhibit a stronger capacitive coupling to the finger than sensing structures at locations corresponding to valleys in the fingerprint. Both one and two-dimensional sensors are possible and within the scope of the invention.

However, the various embodiments of the present invention are not limited to a fingerprint sensing device comprising sensing elements utilizing a particular fingerprint sensing technology, but are equally applicable to, for instance, optical, thermal or piezo-electric fingerprint sensors etc.

The read-out circuitry may include circuitry for converting analog signals to digital signals. Such circuitry may include at least one analog to digital converter circuit. In such embodiments, the fingerprint sensing system may thus provide a fingerprint pattern signal as a digital signal. In other embodiments, the fingerprint pattern signal and the force parameter signal may be provided as an analog signal.

For example, the signals may be analog or digital values indicative of a voltage, which may in turn be proportional to the capacitance of the capacitor constituted by the finger (or other conductive object in the vicinity of the finger detecting structure), the finger detecting structure and the dielectric material there between.

The sensed fingerprint pattern may be used for various purposes, such as biometric enrollment or authentication, or fingerprint pattern based navigation etc.

The electronic unit may be any electrical unit which is operable to send and/or receive signals. The electronic unit is arranged so that it can communicate with the body area network communication circuitry (BAN communication circuitry) via the user's body, thus the signal travels through the user's body. The BAN may for example follow the standard IEEE 802.15.6 (Body Area Network) which is part of the 802.15 (Wireless Personal Area Network) series.

The transition between the first and the second state may be controlled by a host control unit, for example a control unit comprised in an electronic device comprising the combined fingerprint sensing and BAN communication system.

The present invention is based upon the realization that a connection electrode for connecting to the BAN can be combined with a connection for the finger used by the fingerprint sensor. The location of such a connection electrode is optimal since it will be touched by the finger for fingerprint acquisition thus thereby providing sufficient physical contact between the finger and the connection electrode for serving as an antenna for the BAN system. Furthermore, it has been realized that the BAN communication circuitry and the fingerprint sensing system may disturb each other, thus the combined fingerprint sensing and body area network communication system operates in two separate states so that they do not interfere with each other.

In one embodiment, the body area network circuitry may be in an at least partly inactive mode in the fingerprint sensing state. In this way, the interference between the BAN communication circuitry and the sensing arrangement is reduced. The at least partly inactive mode may for example be that the BAN communication circuitry may not communicate with the electronic unit on the user's body, thus receive signals from the electronic unit or send signals to the electronic unit, in the first state. The BAN communication circuitry may however, communicate with other external devices in the at least partly inactive mode, for example to send information to the cloud or to a stationary or mobile electronic device.

According to one embodiment, the sensing arrangement may further comprise control circuitry, wherein a transition between the states is controlled by the control circuitry. Thus, the sensing arrangement, e.g. a fingerprint sensor, may be the master in the system, and the BAN-communication circuitry thus serves as a slave, thereby being controlled by the control circuitry of the sensing arrangement.

In one embodiment, the sensing arrangement may be configured to provide an instruction signal to the body area network communication circuitry for allowing the body area network communication circuitry to send the second signal to the electronic unit via the user's body and the connection electrode or to receive the second signal from the electronic unit. The instruction signal thus provides an efficient implementation for reducing the interference between the BAN communication circuitry and the sensing arrangement.

In one embodiment, the sensing arrangement may be configured to instruct the body area network communication circuitry to be in an at least partly inactive mode during a time slot in which the system is in the fingerprint sensing state.

According to another embodiment, the body area network communication circuitry may comprise a transceiver for communicating information obtained from the electronic device to an external electronic device. In other words, the body area network communication circuitry may communicate with devices other than the electronic unit in the BAN. For example, the body area network communication circuitry may send information read form the electronic unit on the user's body to an external communication center e.g. a server or a central computer, or even to a body area network communication circuitry of a second BAN. The transceiver may transmit signals wirelessly to external devices.

The body area network communication circuitry may also comprise a transceiver for sending signals to the electronic unit.

According to one embodiment, the connection electrode is arranged for providing a finger drive signal to the finger for driving the potential of the finger relative the sensing structure potential between a relatively high potential and a relatively low potential. In other words, the connection electrode provides a drive potential for generating a change in potential difference between a sensing structure potential of the sensing structure and a finger potential of the finger. The finger drive signal may advantageously be a pulse train applied to the finger. In synchronization with each pulse in the pulse train, a sensing signal from one or several of the sensing elements may be acquired. The sensing signal from a sensing element is indicative of the response of that particular sensing element to the finger excitation signal, which is in turn dependent on the capacitive coupling between the finger and that sensing element.

It should further be noted that the present invention is also applicable to fingerprint sensing techniques where the change in potential difference between a sensing structure potential of the sensing structure and a finger potential of the finger is provided by that the sensing structure potential follows a sensing reference potential of the sensing arrangement. In other words, the read-out circuitry being connected to each of the sensing structures in such a way that the sensing structure potential follows a sensing reference potential of the sensing arrangement.

According to one embodiment, in the a fingerprint sensing state, the sensing arrangement may be connected to the connection electrode and the communication unit may not be connected to the connection electrode, and in the body area network communication state the body area network communication circuitry may be connected to the connection electrode, and the sensing arrangement may not be connected to the connection electrode. Thus, for reducing the interference between the BAN communication circuitry and the sensing arrangement even further, they are alternatingly electrically connected to the connection electrode.

For example, in one embodiment, the system may further comprise a switch arranged to, in the fingerprint sensing state, connect the sensing arrangement with the connection electrode, and, in the body area network communication state, connect the body area network communication circuitry with the connection electrode.

According to one embodiment, the system may be configured to: perform, in the a fingerprint sensing state, a user authentication procedure to authenticate the user, when the result of the authentication procedure indicates a successful authentication of the user, read, using the body area network communication circuitry, information from the electronic device. Thus, the sensing arrangement may sense the fingerprint pattern of the user's finger in the first state to acquire a verification representation from a fingerprint image, if the verification representation matches an enrolment representation previously enrolled by the user, the system may proceed to read information from the electronic unit of the BAN. Note that the BAN may have more than one electronic unit connected to it.

The connection electrode may for example be a bezel for the sensing arrangement. A bezel is typically a ring electrode arranged around the sensing structures and may for example further provide electro-static discharge protection for the system.

In another embodiment, the connection electrode may be a metallic housing for the sensing arrangement. One example of implementation a metallic housing for providing a drive signal to the finger is described in US2015/0347807 which is herein incorporated by reference.

Furthermore, the read-out circuitry may be connected to each of the sensing structures in such a way that the sensing structure potential follows a sensing reference potential of the sensing arrangement, and supply circuitry may be connected to the sensing arrangement for providing, to the sensing arrangement, the sensing reference potential in the form of a sensing reference signal alternating, in relation to an electronic device reference potential, between a first sensing reference potential and a second sensing reference potential, a change in potential difference, in relation to the device reference potential, between the first sensing reference potential and the second sensing reference potential resulting in the change in potential difference between the finger potential and the sensing structure potential. This advantageously implements a "swinging chip" sensing arrangement, in which the finger potential is kept constant and the first signal provided to the finger is a ground signal.

According to a second aspect of the present invention, there is provided an electronic device comprising a control unit and a combined fingerprint sensing and body area network system according to any one of the previous embodiments of the previous aspect.

The fingerprint sensor may for example be a capacitive fingerprint sensor.

Furthermore, the electronic device may advantageously be a mobile phone. However, other electronic devices are of course thinkable such as tablets, laptops desktop computers, etc.

Further embodiments of, and effects obtained through this second aspect of the present invention are largely analogous to those described above for the first aspect of the invention.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "control unit" should be understood to include any type of computing device, such as an ASIC, a micro-processor, etc. It should also be understood that the actual implementation of such a control unit may be divided between a plurality of devices/circuits.

In the context of the present application, the "enrolment representation" and/or the "verification representation" of a fingerprint image may be any information extracted from the fingerprint image, which is useful for assessing the similarity between fingerprint images acquired at different times. For instance, the enrolment/verification representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized.

Various ways of extracting such verification representation or enrolment representation from a fingerprint image are well-known to a person of ordinary skill in the relevant art.

In summary, the present invention relates to a combined fingerprint sensing and body area network communication system for communication with an electronic unit using the body of a user as communication medium, comprising: a sensing arrangement and a body area network communication circuitry. The system is controllable between: a fingerprint sensing state, in which a first signal corresponding to the finger potential is provided to a connection electrode and a readout circuitry is controlled to provide sensing signals indicative of the capacitive coupling between each sensing structure and the user's finger; and a body area network communication state in which a second signal is provided to the connection electrode by a first of the electronic unit and the body area network communication circuitry to the other one of the electronic unit and the body area network communication circuitry.

BRIEF DESCRIPTION OF THE DRAWINGS

These and other aspects of the present invention will now be described in more detail, with reference to the appended drawings showing an example embodiment of the invention, wherein:

FIG. 1 schematically illustrates a mobile phone comprising a combined fingerprint sensing and body area network system according to an example embodiment of the present invention;

FIG. 2a-c conceptually shows embodiments of the combined fingerprint sensing and body area network system comprised in the electronic device in FIG. 1;

FIG. 8 is a schematic block diagram of the embodiment of the combined fingerprint sensing and body area network system in FIG. 4a;

DETAILED DESCRIPTION OF EXAMPLE EMBODIMENTS

Figure 3:
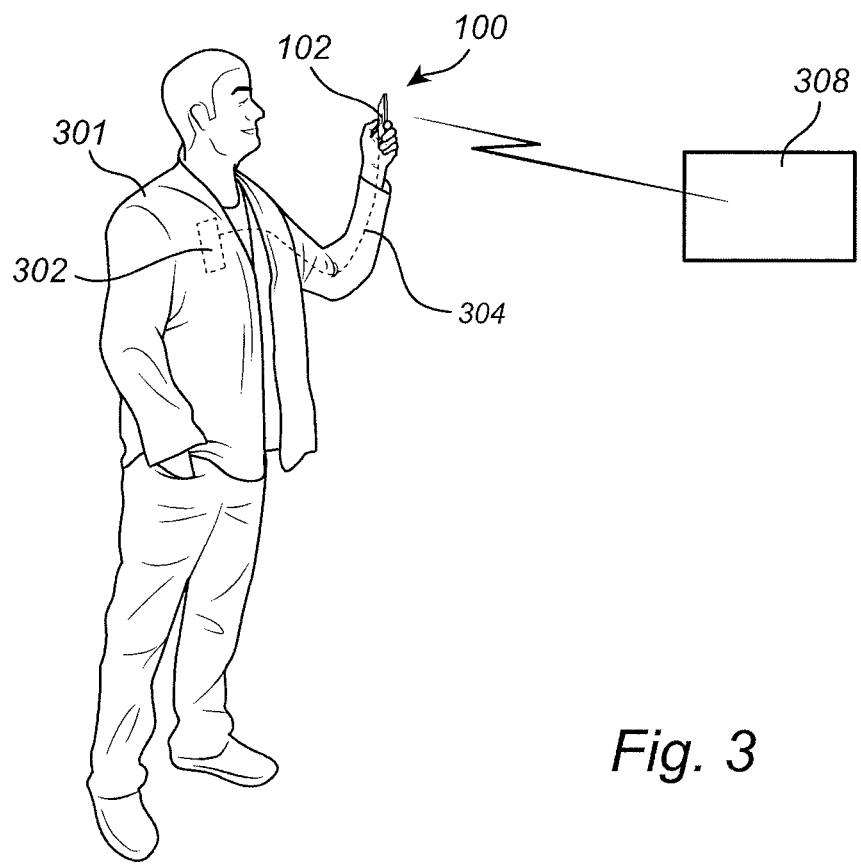
FIG. 3 illustrates an exemplary application for the combined fingerprint sensing and body area network system.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout. For example, various embodiments of the fingerprint sensing and body area network communication system according to the present invention are mainly described with reference to an electronic device in the form of a mobile phone. Although this is convenient for many applications, it should be noted that many other kinds of electronic devices such as desktop computers, tablets, laptops, or stationary devices e.g. at hospitals for downloading health information from a patient.

Turning now to the drawings and to FIG. 1 in particular, there is schematically illustrated the electronic device according to the present invention, in the form of a mobile phone 100 with an combined fingerprint sensing and body area network communication system 102 and a display unit 104 with a touch screen interface 106. In this embodiment the combined fingerprint sensing and body area network communication system 102 and the display unit 104 are together arranged at the front side of the mobile phone 100. The combined fingerprint sensing and body area network communication system 102 may, for example, be used for unlocking the mobile phone 100 and/or for authorizing transactions carried out using the mobile phone 100, or for downloading health information from a patient carrying a medical electronic device such as a sensor on his/her body. The combined fingerprint sensing and body area network communication system 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

With reference to FIG. 2a, there is conceptually illustrated a somewhat enlarged view of the combined fingerprint sensing and body area network communication system 102. In the case of employing a capacitive sensing technology, the sensing arrangement of the combined fingerprint sensing and body area network communication system 102 is configured to comprise a large plurality of sensing structures, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing structure (also denoted as a pixel) is in FIG. 2a indicated by reference numeral 202. There is further shown in FIG. 2a an exemplary connection electrode 203 arranged adjacent to the sensing structures for making electrical contact with the finger when sensing the fingerprint pattern.

With reference to FIG. 2b, there is conceptually shown a combined fingerprint sensing and body area network communication system comprising a plurality of sensing structures 202 and a connection electrode in the form of a bezel 204 (e.g. a ring electrode) arranged around the array of sensing structures. In a another embodiment, as illustrated conceptually in FIG. 2c, the connection electrode is provided in the form of a conductive housing 205 in which the sensing structures are accessible through an opening 206 in the housing 205.

FIG. 3 schematically shows an implementation of the combined fingerprint sensing and body area network system 102 integrated in an electronic device 100. There is shown an electronic unit 302 arranged in contact with a user's body 301. The combined fingerprint sensing and body area network system 102 comprises a connection electrode (not shown in FIG. 3) such that a body area network communication circuitry (not shown in FIG. 3) such as a transceiver can communicate with the electronic unit 302 via the user's body, thus the user's body serves as a conduction medium. Although there is here only shown a single electronic unit 302, there may in practice be more than one electronic unit arranged in contact with the user's body and which can communicate (signals denoted 304) via the user's body 301 with the body area network communication circuitry. The body area network communication circuitry may comprise a transceiver for sending signals (denoted 306) to an external device 308 such as a control unit located remotely. The signals provided to the externals device may for example be data obtained from the electronic unit 302. The transceiver may communicate via wires or wirelessly with the external device 308.

Figure 4A:
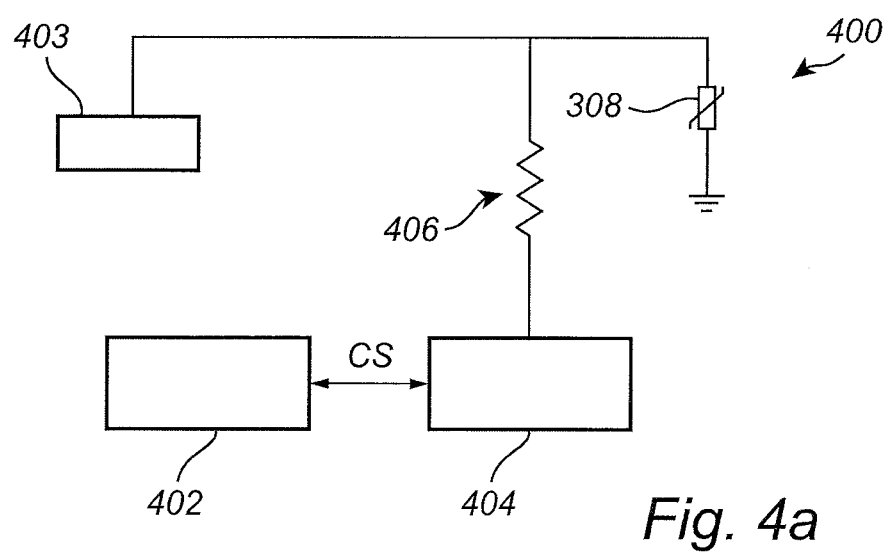
FIG. 4a-b are schematic block diagrams of embodiments of a the combined fingerprint sensing and body area network system.

FIG. 4a schematically shows a block diagram of an embodiment of the invention. In FIG. 4a, the sensing arrangement 402 of the combined fingerprint sensing and body area network system 400 is configured to communicate with the body area network communication circuitry 404 to instruct the body area network communication circuitry 404 when to read data from the electronic unit 302 (see FIG. 3) or send signals to the electronic unit 302 arranged on or near the user's body. In this embodiment, in the fingerprint sensing state, the connection electrode 403 is provided with a finger potential such as e.g. ground, and the read-out circuitry of the sensing arrangement is configured provided sensing signals indicative of the capacitive coupling between a finger and the sensing structures (not shown). The sensing arrangement is configured to instruct the body area network communication circuitry 404 when it is allowed to read/send signals from/to the electronic unit via the connection electrode 203. This can be performed by sending an instruction signal CS (see FIG. 5) to the body area network communication circuitry 404. In the embodiment of FIG. 4a, the change in potential difference between the finger and the sensing structure is provided by a change in potential of the sensing structure reference potential with respect to the electronic device reference potential. The body area network communication circuitry 404 may be connected to the connection electrode 404 via a resistive component 406, and the connection electrode may be connected to an electrostatic discharge protection circuit 308 known to in the art.

Figure 4B:
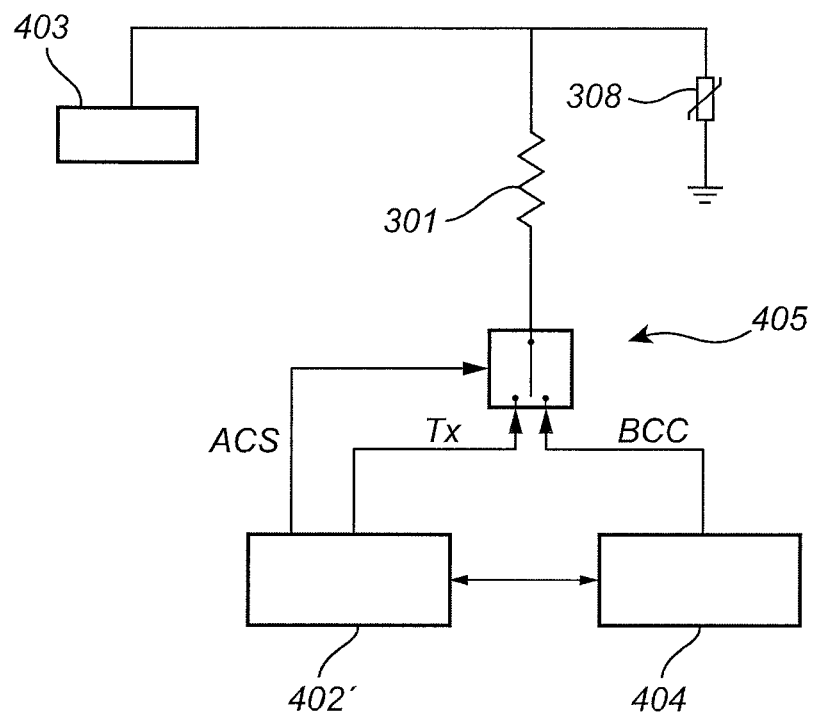

FIG. 4b shows a block diagram of another embodiment of the invention. In this embodiment, the body area network communication circuitry 404 and the sensing arrangement 402' are connected to a switch 405 which is configured to alternatingly connect the sensing arrangement 402' and the body area network communication circuitry 404 to the connection electrode 403. In the fingerprint sensing state the finger potential is provided to the connection electrode 403 via the switch 405 and the readout circuitry is controlled to provide the sensing signals indicative of the capacitive coupling between each sensing structure 202 and the user's finger. Furthermore, the sensing arrangement provides the finger excitation signal TX (see description with reference to FIG. 6 and FIG. 7) via the switch 405 and the connection electrode to the finger. In the body area network communication state, the switch 405 is configured to connect the body area communication circuitry 404 with the connection electrode 203 such that the body area communication circuitry 404 can send signals (BCC) to, or receive signals (BCC) from, the electronic unit arranged on the user's body via the connection electrode 403.

Figure 5:
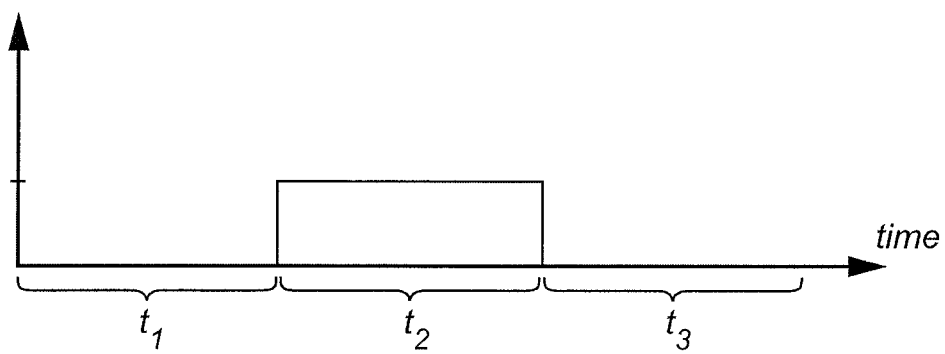
FIG. 5 is an exemplary timing diagram for a coexistence signal.

FIG. 5 schematically illustrates a timing diagram of a "coexistence signal", e.g. a control signal provided by the sensing arrangement to the body area network communication circuitry for transitions between the fingerprint sensing state and the body area network communication state. During a first time slot $t_1$ the combined fingerprint sensing and body area network communication system is in a fingerprint sensing state. After time $t_1$, the sensing arrangement may have finished sensing a fingerprint pattern of a user's finger, and may thus allow the body area network communication circuitry to communicate with the electronic unit via the connection electrode, thereby the system transitions to the body area network communication state. The transition is initiated by the sensing arrangement which is the master in the system, the body area communication circuitry is the slave. Thus, first the fingerprint pattern is read, subsequently, the electronic unit is read by the body area communication circuitry. In the fingerprint sensing state, the body area network circuitry is in an at least partly inactive mode, thereby not communicating with the electronic unit on the user's body via the connection electrode 203. Optionally, at time $t_2$, the system returns to the fingerprint sensing state. The signal described in FIG. 5 is provided either by the sensing arrangement or by a host electronic device to the body area network circuitry.

Figure 6:
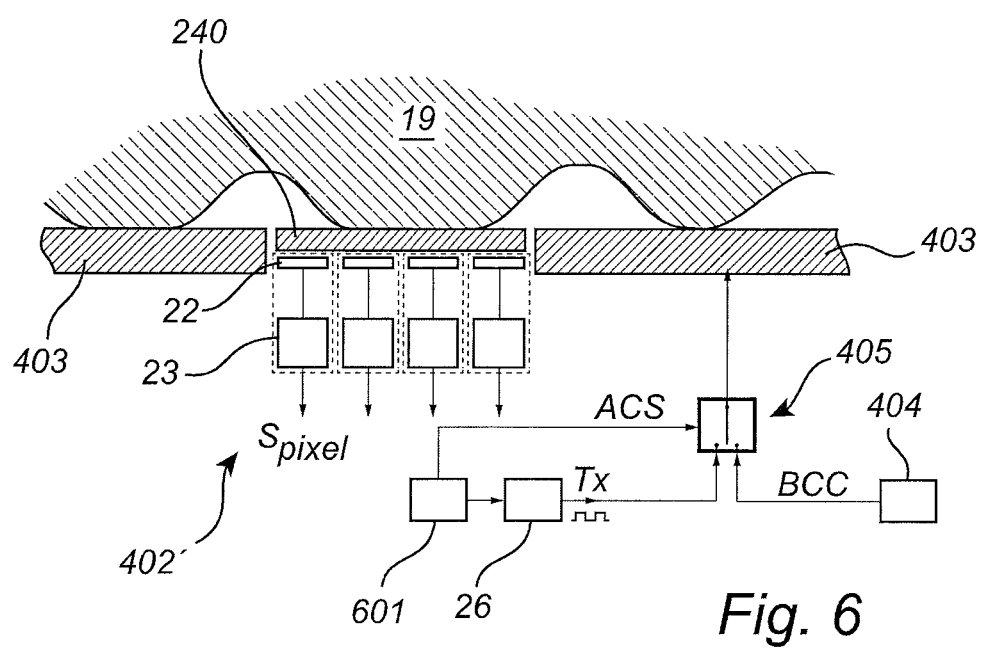
FIG. 6 is a schematic cross-section view of the combined fingerprint sensing and body area network communication system conceptually described in FIG. 4b.

FIG. 6 is a schematic cross-section view of the combined fingerprint sensing and body area network communication system conceptually described in FIG. 4b illustrating an embodiment in which the connection electrode 403 is used for providing the finger excitation signal to the finger 19. Referring to FIG. 6, the sensing arrangement 402' comprises a plurality of sensing structures (plate) 22 and a read-out circuit 23 (only one of the sensing structures and the read out circuitry has been indicated with a reference numeral to avoid cluttering the drawing). As is schematically shown in FIG. 6, the sensing structures 22 are protected by a dielectric layer 24, which is contacted by the user's finger 19. The sensing arrangement 402' further comprises finger excitation circuitry 26 that is alternatingly connected to the connection electrode 403 via switch 405.

When the sensing arrangement 3 is operating to detect a fingerprint pattern, i.e. in the fingerprint sensing state, the finger excitation circuitry 26 which is controlled by the control circuitry 601, provides a finger excitation signal TX to the finger 19 via the switch 405 which is configured to at least intermittently allow the potential of the connection electrode 403 to follow the finger excitation signal TX. As is schematically illustrated in FIG. 6, the finger excitation signal TX may be provided in the form of a pulse train having a pulse repetition frequency. The coupling of the finger excitation signal TX from the finger 19 to the sensing structures 22 of the sensing arrangement 402' is an indication of the capacitance between the finger and the respective sensing structures. Based on the pixel signals Spixel provided by the read-out circuitry 21, a representation of the fingerprint pattern can be determined by means known to the skilled person. Furthermore, a body area communication circuitry 404 is connected to the switch 405 and is configured to, in a body area network communication state, send signals to or receive signals from an electronic unit arranged on the user's body, via the connection electrode 403. The switch is controlled by the sensing arrangement by an antenna control signal (ACS) sent from the control circuitry 601 to the switch 405 to transition between the states. The operation of the sensing arrangement 402' will now be described in more detail with reference to FIG. 7.

Figure 7:
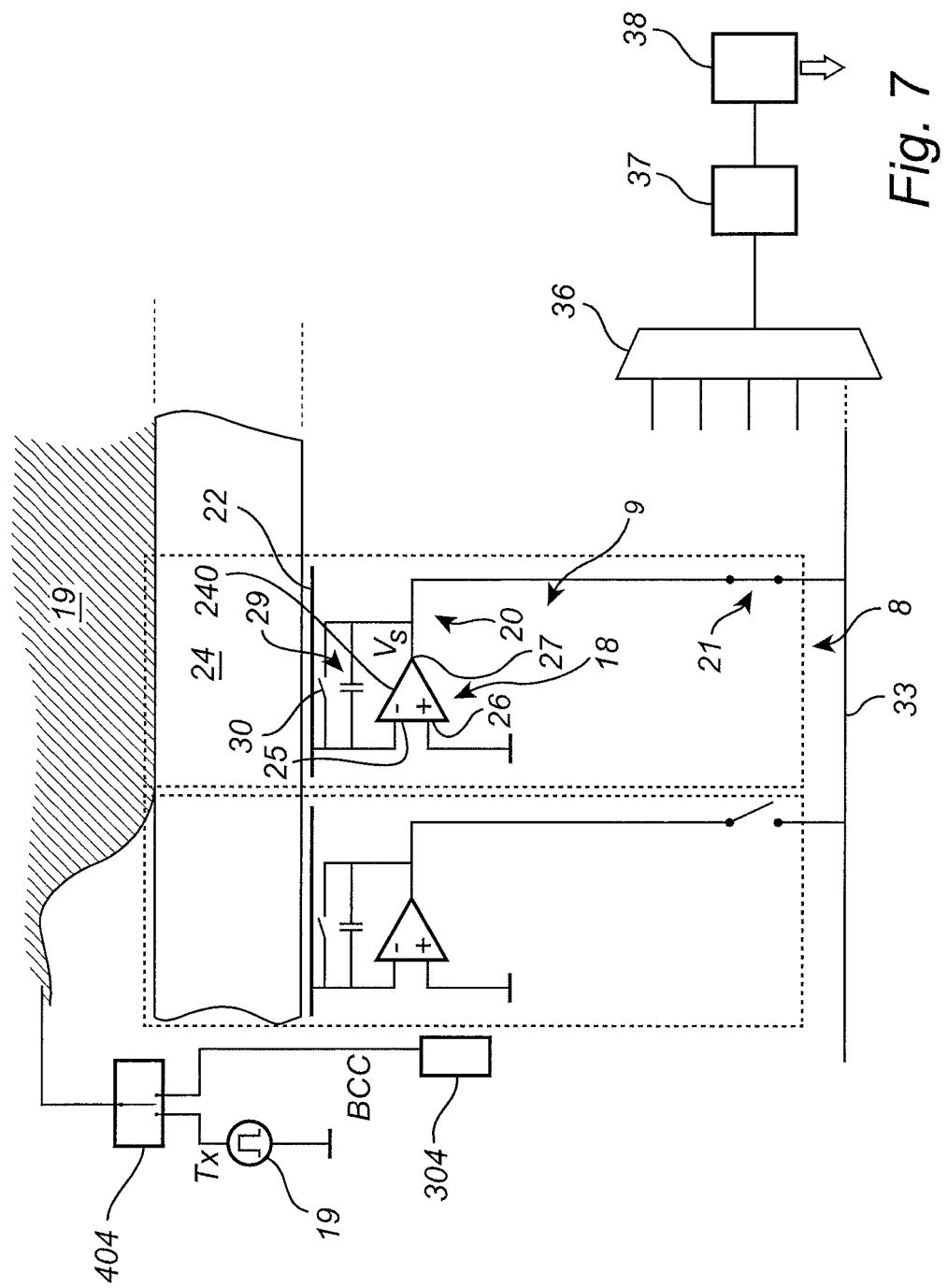
FIG. 7 is a schematic cross section of a portion of a combined fingerprint sensing and body area network communication system according to FIG. 4b.

FIG. 7 is a schematic hybrid cross section of a portion of a combined fingerprint sensing and body area network communication system according to FIG. 4b with a finger 19 placed on top of the protective dielectric top layer 13 covering the array of sensing structures 22. Referring to FIG. 7, the fingerprint sensing device 2 comprises an excitation signal providing circuit 26 electrically connected to the finger via a conductive finger drive structure (i.e. a connection electrode, not shown in FIG. 4), a plurality of sensing elements 8 (e.g. a pixel), each sensing element 8 comprises a conductive sensing structure, here in the form of a metal plate 22 underneath the protective dielectric top layer 13, and a read-out-circuitry 9 comprising a charge amplifier 18, and selection circuitry, here functionally illustrated as a simple selection switch 21 for allowing selection/activation of the sensing element 8.

The charge amplifier 18 comprises at least one amplifier stage, here schematically illustrated as an operational amplifier (op amp) 24 having a first input (negative input) 25 connected to the sensing structure 22, a second input (positive input) 26 connected to sensor ground or another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 240 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 7, the first input 25 of the charge amplifier is virtually grounded.

When a time-varying potential is provided to the finger 19 by the excitation signal providing circuitry 26, a corresponding time-varying potential difference occurs between the sensing structure 22 and the finger 19.

The above-described change in potential difference between the finger 19 and the sensing structure 22 results in a sensing voltage signal $V_s$ on the output 27 of the charge amplifier 18.

When the indicated sensing element 8 is selected for sensing, the selection switch 21 is closed to provide the sensing signal to the readout line 33. The readout line 33, which may be a common readout line for a row or a column of the sensor array in FIG. 2, is shown in FIG. 7 to be connected to a multiplexer 36. As is schematically indicated in FIG. 7, additional readout lines from other rows/columns of the sensor array may also be connected to the multiplexer 36.

The output of the multiplexer 36 is connected to a sample-and-hold circuit 37 and an analog-to-digital converter 38 in series for sampling and converting the analog signals originating from the sensing elements 8 to a digital representation of the fingerprint pattern of the finger 19.

In FIG. 7, the finger 19 is shown as being connected to an excitation circuit 19 for providing the desired potential difference between the finger 19, and the sensing plates 22. It should be noted that this desired potential difference may alternatively be provided by changing the ground level of the sensing arrangement in relation to the ground level of the electronic device (such as mobile phone 1) in which the fingerprint sensing arrangement is included. This embodiment is described with reference to FIGS. 8-10.

Further, the switch 404 may be arranged to alternatingly connect the connection electrode to the sensing arrangement in the fingerprint sensing state and for connecting the body area network communication circuitry 304 to the connection electrode in the body area network communication state as previously described with reference to preceding drawings.

Figure 8:
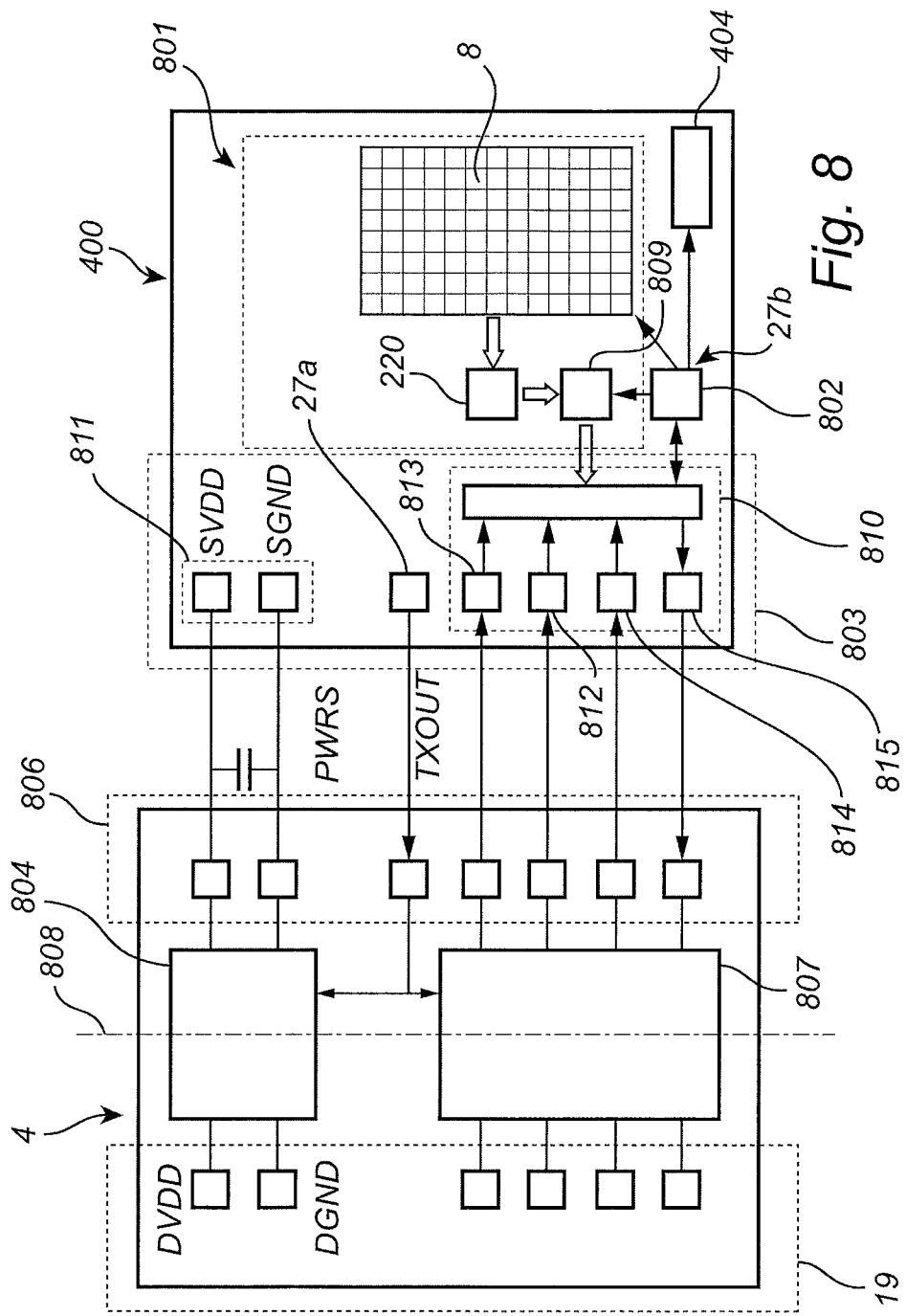

Now an exemplary embodiment in which the connection electrode provides a ground signal to the finger in the fingerprint sensing state will be described. In this embodiment a "swing chip" configuration is implemented. Thus, with reference to FIG. 8, which is a simplified schematic block diagram of the embodiment of the combined fingerprint sensing and body area network system in FIG. 4a, a combined fingerprint sensing and body area network communication system 400 comprises a sensing arrangement 801, a sensing arrangement controller 802, and a sensing arrangement interface 803. An interface circuit 4 comprises, as is indicated in FIG. 8, supply circuitry 804, level shifting circuitry 805, a sensor connection interface 806, and a device connection interface 807. The sensor connection interface 806 is in a first voltage domain of the interface circuit 4 having the same reference potential as the combined fingerprint sensing and body area network communication system 400, and the device connection interface 807 is in a second voltage domain of the interface circuit 4 referenced to the device reference potential of the electronic device 100. The border between the first voltage domain and the second voltage domain is schematically indicated in FIG. 8 by the vertical dashed line 808 passing through the supply circuitry 15.

Turning again to the combined fingerprint sensing and body area network communication system 400 in FIG. 8, the sensing arrangement 801 comprises sensing elements 8, sampling circuitry 220 for sampling sensing signals output by the sensing elements 8, and an analog-to-digital converter (ADC) 809 for converting the analog signal values sampled by the sampling circuitry 220 to digital values that may constitute a fingerprint pattern signal, such as a fingerprint image. The sensing arrangement interface 803 comprises a sensor communication interface 810, a sensor voltage supply interface 811, and a timing output 27a.

Figure 9:
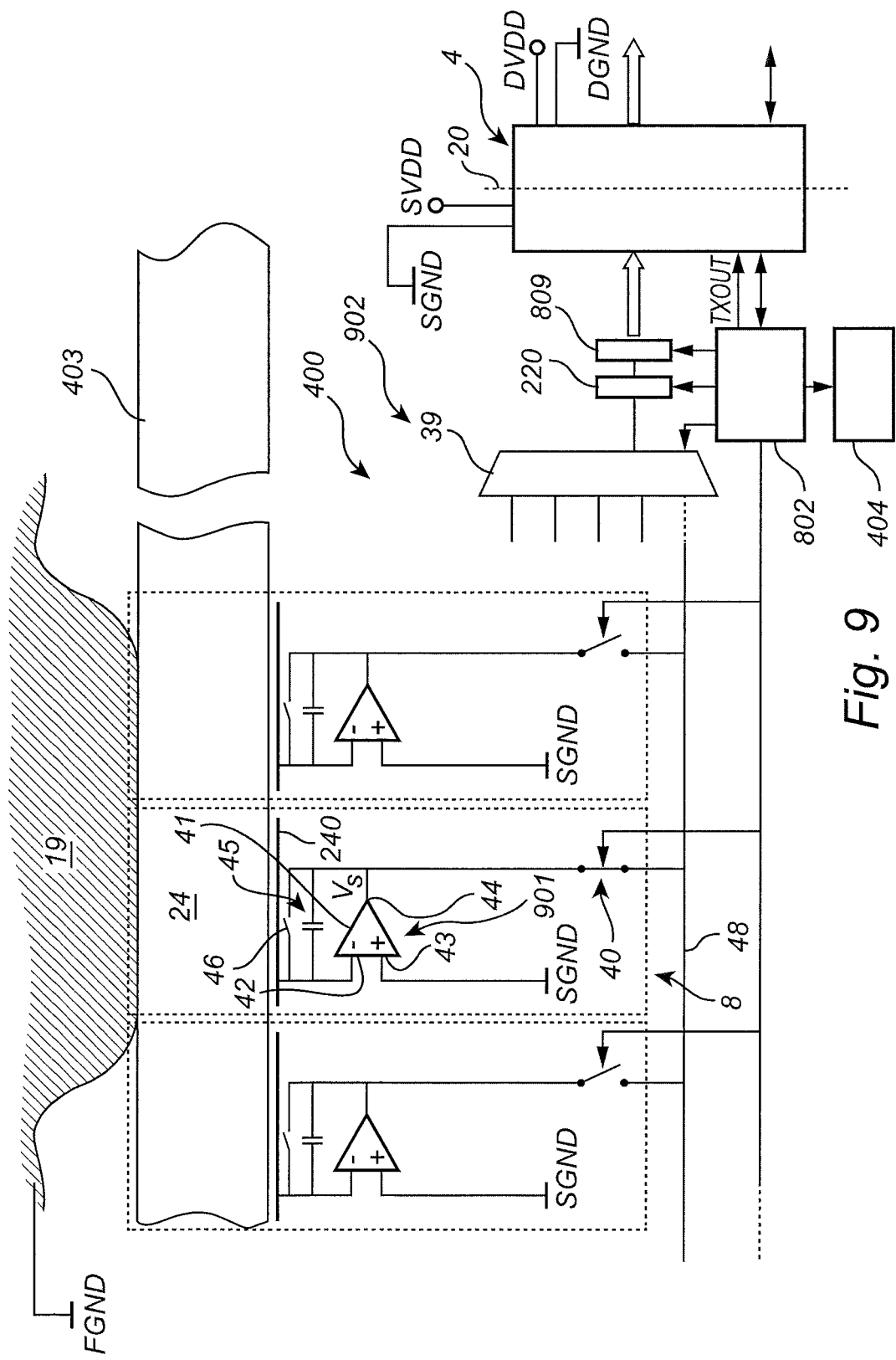
FIG. 9 is a schematic cross section view of a portion of the fingerprint sensing and body area network communication system in FIG. 8; and, FIGS. 10a-b are graphs schematically illustrating the relation between the sensing reference potential and the sensing signal output by the charge amplifier in FIG. 9, as well as exemplary sampling times.

In the embodiment of FIGS. 8-9, the sensor communication interface 810, which may for example, be an SPI slave interface, passes the fingerprint pattern signal from the ADC 809 to the electronic device 100 via the interface circuitry 4, and sensor control signals originating from the electronic device 100 to the sensing arrangement controller 802.

The sensor communication interface 810 is illustrated as a simplified SPI (serial peripheral interface) port comprising a serial clock input (SCK) 812, a master output slave input (MOSI) 813, a slave select input 814; and a master input slave output (MISO) 815.

The sensor voltage supply interface 811 receives a supply voltage from the interface circuit 4 as the substantially constant difference between a sensor ground potential SGND and a sensor supply potential SVDD. The sensor ground potential SGND and the sensor supply potential SVDD vary together in relation to device ground DGND.

Through the timing output 27a, the combined fingerprint sensing and body area network communication system 400 provides a timing signal TXOUT to the interface circuit 4, to allow the operation of the interface circuit to be timed with the operation of the sensing arrangement 801.

Through the body area network control output 27b, sensing arrangement controller 12 provides a control signal to a body area network communication circuitry 404 such that the body area network communication circuitry is allowed to read data from or provide signals to an electronic unit arranged on a user's body via the connection electrode (not shown in FIG. 8).

In the simplified example of FIG. 8, the device connection interface 807 of the interface circuit 4 comprises inputs for receiving the device ground potential DGND and the device supply potential DVDD, and an SPI-interface for allowing communication between the electronic device 100 and the combined fingerprint sensing and body area network communication system 400 via the interface circuit 4 as well as between the electronic device 100 and the interface circuit 4.

The sensor connection interface 806 of the interface circuit 4 is connected to the sensing arrangement interface 803 of the combined fingerprint sensing and body area network communication system 400 for providing the sensor ground potential SGND and the sensor supply potential SVDD to the combined fingerprint sensing and body area network communication system 400, for allowing communication with the combined fingerprint sensing and body area network communication system 400 and for receiving the timing signal TXOUT provided by the sensor. As is schematically indicated in FIG. 8, the timing signal TXOUT is used for controlling operation of the supply circuitry 804 and the level shifting circuitry 805.

An example configuration of the sensing arrangement 801 and the provision of the fingerprint sensing signal from the sensing arrangement for the combined fingerprint sensing and body area network communication system 400 will now be described with reference to FIG. 9.

FIG. 9 is a schematic cross section view of a portion of the fingerprint sensing and body area network communication system 400 described with reference to FIG. 8 with a finger 19 placed on top of the combined fingerprint sensing and body area network communication system 400. The finger 19 has a finger potential FGND. As is schematically shown in FIG. 9, the combined fingerprint sensing and body area network communication system 400 comprises a plurality of sensing structures 240, here in the form of metal plates underneath the dielectric structure 24, and read-out circuitry 902 connected to each of the sensing structures 240. In the example embodiment of FIG. 3, the read-out circuitry comprises a plurality of charge amplifiers 901, a multiplexer 39, the above-mentioned sampling circuitry 220, the above-mentioned ADC 809, and selection circuitry, here functionally illustrated as a simple selection switch 40 for allowing selection/activation of different sensing elements 8.

The charge amplifier 901 comprises at least one amplifier stage, here schematically illustrated as an operational amplifier (op amp) 41 having a first input (negative input) 42 connected to the sensing structure 240, a second input (positive input) 43 connected to sensor ground SGND, and an output 44. In addition, the charge amplifier 901 comprises a feedback capacitor 45 connected between the first input 42 and the output 44, and reset circuitry, here functionally illustrated as a switch 46, for allowing controllable discharge of the feedback capacitor 45. The charge amplifier 901 may be reset by operating the reset circuitry 46 to discharge the feedback capacitor 45.

As is often the case for an op amp 41, the potential at the first input 42 follows the potential applied to the second input 43. Depending on the particular amplifier configuration, the potential at the first input 42 may be substantially the same as the potential at the second input 43, or there may be a substantially fixed offset between the potential at the first input 42 and the potential at the second input 43.

In addition to the sensing arrangement comprising the sensing structures 240 and the read-out circuitry 902 as described above, the combined fingerprint sensing and body area network communication system 400 further comprises the sensing arrangement controller 802 as described above. In FIG. 9, the sensing arrangement controller 802 is shown to control the selection circuitry 40, the multiplexer 39, the sampling circuitry 220 and the ADC 809.

FIG. 9 also schematically shows the interface circuit 4 connected to the combined fingerprint sensing and body area network communication system 400 and to the rest of the electronic device 100 as described above with reference to FIG. 2*a-b*. As is schematically indicated in FIG. 8, the interface circuit 4 provides the above-mentioned sensing reference potential (SGND and SVDD) to the combined fingerprint sensing and body area network communication system 400. In the simplified example of FIG. 8, the sensor ground potential is provided to the second input 43 of each charge amplifier 901 comprised in the read-out circuitry 901.

At least when the fingerprint sensing and body area network system 400 is in a fingerprint sensing state, the interface circuit 4 provides the sensing reference potential (SGND) to the combined fingerprint sensing and body area network communication system 400 in the form of a sensing reference signal alternating, in relation to the device reference potential DGND, between a first sensing reference potential $V_L$ and a second sensing reference potential $V_H$. Since the finger potential FGND is substantially constant in relation to the device reference potential DGND (for example through an electrical connection between the electronic device and the hand of the user), and the potential of the sensing structure 240 substantially follows the potential at the second input 43 of the charge amplifier 901, the time-varying, in relation to the device reference potential DGND, potential SGND at the second input 43 results in a time-varying potential difference between the sensing structure 240 and the finger 19.

A change in potential difference between the sensing structure 240 and the finger 19 will in turn result in a change of the charge carried by the sensing structure 240 that is indicative of the capacitive coupling between the finger 19 and the sensing structure (plate) 240. The sensing signal $V_s$ provided at the output 44 of the charge amplifier 901 will be indicative of this change of charge carried by the sensing structure 240 and thus of the local capacitive coupling between the finger 19 and the sensing structure 240.

Between sensing operations, the feedback capacitor 45 needs to be reset (the charge across the feedback capacitor 45 is equalized). This is carried out using the reset switch 46.

When the indicated sensing element 8 is selected for sensing, the selection switch 40 is closed to connect the output of the charge amplifier to the readout line 48. The readout line 48 is connected to the multiplexer 39. As is schematically indicated in FIG. 3, additional readout lines providing sensing signals from other groups of sensing elements are also connected to the multiplexer 39.

At least the operation of the reset switch 46 and the sampling of the sensing signal $V_s$ need to be synchronized with changes of the sensor ground potential SGND in relation to the device ground potential DGND. In the example embodiment of FIG. 9, this synchronization is handled by the sensing arrangement controller 802 that controls the timing of the reset switch 46 and provides the above-mentioned timing signal TXOUT to the interface circuit to thereby control the timing of the transitions of the sensing reference potential SGND from the first sensing reference potential VL to the second sensing reference potential VH, or from the second sensing reference potential VH to the first sensing reference potential VL, in relation to the timing of the reset switch 46.

As is schematically indicated in FIG. 9, the sensing arrangement controller also controls the timing of the sampling of the sensing signal $V_s$ by the sampling circuit 220 and the A/D-conversion of the sampled sensing signals by the ADC 809.

An exemplary timing relation between sensing reference signal SGND, operation of the reset switch 46 and sampling of the sensing signal $V_s$ using the sampling circuit 220 will be described below with reference to FIGS. 4*a-b*.

Figure 10A:
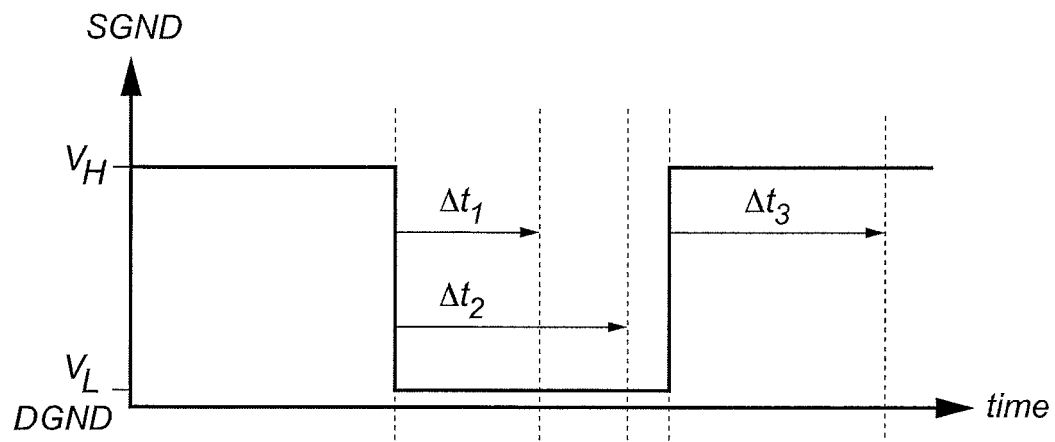
Figure 10B:
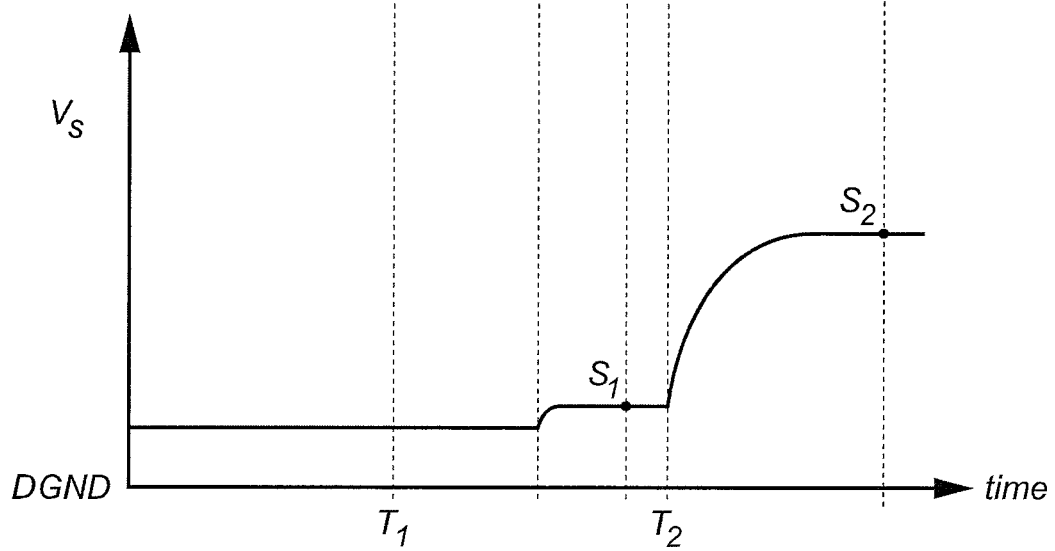

FIG. 10*a* shows the sensing reference potential (the sensor ground potential SGND) in relation to the device ground potential DGND. As described above, the potential of the sensing structure 240 in relation to the device ground potential DGND will exhibit substantially the same behavior, and FIG. 10*b* schematically shows the sensing signal $V_s$.

Referring first to FIG. 10*a*, the sensor ground potential SGND goes from the second sensing reference potential $V_H$ to the first sensing reference potential $V_L$, in relation to the device ground potential DGND, at $T_1$, and then goes back from $V_L$ to $V_H$ at $T_2$. These transitions are controlled by the timing signal TXOUT provided from the combined fingerprint sensing and body area network communication system 400 to the interface circuit 4.

A first delay $\Delta t_1$ after first transition, at $T_1$, the reset switch 46 is operated to bring the charge amplifier 901 to such a state (enabled state) that the output provides a signal if the charge on the sensing plate 240 changes. A second delay $\Delta t_2$ after first transition, the sampling circuit 220 is controlled to sample the sensing signal a first time, resulting in a first sampled value $S_1$.

When the sensor ground potential SGND goes from low to high at $T_2$, there will be a change in the charge on the sensing plate 240 resulting from capacitive coupling with the finger 19. This change in charge is translated into a change in the voltage provided by the charge amplifier 901, that is, a change in the sensing signal $V_s$.

A third delay $\Delta t_3$ after the second transition, at $T_2$, the sampling circuit 22 is controlled to sample the sensing signal a second time, resulting in a second sampled value $S_2$. The difference between $S_2$ and $S_1$ is a measure indicative of the capacitive coupling between the sensing plate 240 and the finger 19.

The sensing arrangement may advantageously be manufactured using CMOS technology, but other techniques and processes may also be feasible. For instance, an insulating substrate may be used and/or thin-film technology may be utilized for some or all process steps needed to manufacture the sensing arrangement.

A control unit in the invention may include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. Combined fingerprint sensing and body area network communication system for communication with an electronic unit using the body of a user as communication medium, comprising:
    a sensing arrangement comprising:
        an array of sensing structures, each being covered by a dielectric structure; and
        read out circuitry connected to each of said sensing structures for providing sensing signals indicative of a capacitive coupling between each sensing structure and the user's finger in response to a change in potential difference between a sensing structure potential of said sensing structure and a finger potential of said finger;
    a connection electrode arranged adjacent to said sensing structures for making electrical contact with said finger when said finger is placed for sensing the fingerprint pattern of the finger;
    a switch; and
    a body area network communication circuitry,
    wherein the system is controllable between:
        a fingerprint sensing state, in which a first signal for controlling the finger potential is provided to the finger via the connection electrode, and the readout circuitry is controlled to provide said sensing signals indicative of the capacitive coupling between each sensing structure and the user's finger; and
        a body area network communication state in which a second signal is provided to the connection electrode by one of the electronic unit and the body area network communication circuitry, the signal is to be sent from said one of the electronic device and the body area network communication circuitry via the user's body to the other one of the electronic unit and the body area network communication circuitry, and
    wherein the switch is arranged to alternatively, in said fingerprint sensing state, connect said sensing arrangement with said connection electrode, and, in said body area network communication state, connect said body area network communication circuitry with said connection electrode.

2. Combined fingerprint sensing and body area network communication system according to claim 1, wherein, said body area network circuitry is in an at least partly inactive mode in said fingerprint sensing state.

3. Combined fingerprint sensing and body area network communication system according to claim 1, wherein said sensing arrangement further comprises control circuitry, wherein a transition between said states is controlled by said control circuitry.

4. Combined fingerprint sensing and body area network communication system according to claim 1, wherein said sensing arrangement is configured to provide an instruction signal to said body area network communication circuitry for allowing the body area network communication circuitry to send said second signal to the electronic unit via the user's body and the connection electrode or to receive said second signal from said electronic unit.

5. Combined fingerprint sensing and body area network communication system according to claim 1, wherein said sensing arrangement is configured to instruct the body area network communication circuitry to be in an at least partly inactive mode during a time slot in which said system is in said fingerprint sensing state.

6. Combined fingerprint sensing and body area network communication system according to claim 1, wherein said body area network communication circuitry comprises a transceiver for sending information obtained from said electronic unit to an external electronic device.

7. Combined fingerprint sensing and body area network communication system according to claim 1, wherein said body area network communication circuitry comprises a transceiver for sending signals to said electronic unit.

8. Combined fingerprint sensing and body area network communication system according to claim 1, wherein said connection electrode is arranged for providing a finger drive signal to said finger for driving the potential of said finger relative the sensing structure potential between a relatively high potential and a relatively low potential.

9. Combined fingerprint sensing and body area network communication system according to claim 1, wherein
    in said a fingerprint sensing state, the sensing arrangement is connected to the connection electrode and the communication unit is not connected to the connection electrode, and
    in said body area network communication state the body area network communication circuitry is connected to the connection electrode, and the sensing arrangement is not connected to the connection electrode.

10. Combined fingerprint sensing and body area network communication system according to claim 1, further comprising a switch arranged to, in said fingerprint sensing state, connect said sensing arrangement with said connection electrode, and, in said body area network communication state, connect said body area network communication circuitry with said connection electrode.

11. Combined fingerprint sensing and body area network communication system according to claim 1, configured to:
   perform, in said a fingerprint sensing state, a user authentication procedure to authenticate the user,
   when the result of the authentication procedure indicates a successful authentication of the user, read, using the body area network communication circuitry, information from said electronic device.

12. Combined fingerprint sensing and body area network communication system according to claim 1, wherein said connection electrode is a bezel for said sensing arrangement.

13. Combined fingerprint sensing and body area network communication system according to claim 1, wherein said connection electrode is a metallic housing for said sensing arrangement.

14. An electronic device comprising:
   a control unit; and
   a combined fingerprint sensing and body area network system according to claim 1.

15. The electronic device according to claim 14, wherein the fingerprint sensor is a capacitive fingerprint sensor.

16. The electronic device according to claim 14, wherein the electronic device is a mobile phone.

* * * * *